US 008622289 B2

(12) United States Patent
Outwater et al.

(10) Patent No.: US 8,622,289 B2
(45) Date of Patent: Jan. 7, 2014

(54) METHOD AND APPARATUS FOR CREDIT CARD TRACKING AT PAY STATIONS

(76) Inventors: Chris Outwater, Santa Barbara, CA (US); William Gibbens Redmann, Glendale, CA (US)

( * ) Notice: Subject to any disclaimer, the term of this patent is extended or adjusted under 35 U.S.C. 154(b) by 0 days.

(21) Appl. No.: 13/286,516

(22) Filed: Nov. 1, 2011

(65) Prior Publication Data

US 2012/0318862 A1 Dec. 20, 2012

Related U.S. Application Data

(60) Provisional application No. 61/408,715, filed on Nov. 1, 2010.

(51) Int. Cl.
*G07F 19/00* (2006.01)

(52) U.S. Cl.
USPC ............ 235/379; 235/375; 235/380; 235/382

(58) Field of Classification Search
USPC ............ 235/379, 375, 380, 382; 705/13, 418
See application file for complete search history.

(56) References Cited

U.S. PATENT DOCUMENTS

| 2006/0255119 A1* | 11/2006 | Marchasin et al. ........... 235/375 |
| 2009/0216637 A1* | 8/2009 | Bayne ............................. 705/14 |
| 2009/0248526 A1* | 10/2009 | Park et al. .................. 705/14.15 |
| 2009/0285396 A1* | 11/2009 | Wong ............................ 380/277 |
| 2010/0131750 A1* | 5/2010 | Pruss et al. .................... 713/151 |
| 2011/0313822 A1* | 12/2011 | Burdick ......................... 705/13 |
| 2012/0286968 A1* | 11/2012 | Jones et al. ............. 340/870.02 |

* cited by examiner

*Primary Examiner* — Allyson Trail
(74) *Attorney, Agent, or Firm* — Clifford Kraft (57) ABSTRACT

An enhancement to a pay station where subscribers can track usage of credit cards or groups of credit cards at parking and other facilities. The subscriber provides a key that can be used with a predetermined hash or encryption algorithm to hash or encrypt every credit card number that enters the system. A database of the coded results for a set of pre-registered credit cards belonging to that subscriber is maintained in the pay station database. Whenever an incoming credit card's coded output matches one of the coded results on the pre-registered list, a log entry can be made in a usage log. The subscriber generally has a list of the coded outputs for each of their pre-registered cards. The subscriber can thus track usage of any of these cards.

16 Claims, 5 Drawing Sheets

METHOD AND APPARATUS FOR CREDIT CARD TRACKING AT PAY STATIONS

This application is related to, and claims priority from, U.S. Provisional patent application No. 61/408,715 filed Nov. 1, 2010. Application 61/408,715 is hereby incorporated by reference.

BACKGROUND

1. Field of the Invention

The present invention relates generally to the field of pay stations and more particularly to credit card tracking at pay stations.

2. Description of the Prior Art

Pay stations are used for parking and other services. Many of these stations are automatic and can accept credit and debit cards. This type of pay station has access to a database from the main office. A copy of the database may be kept locally with the pay station, or the database may be accessed remotely by having communication with the main office, whether constant, on-demand, periodically, or only occasionally. This database may contain a list of known bad credit cards (i.e., a black list) to minimize failed or unpaid transactions. The database may also be used to record transactions using card numbers for billing to the credit card company. However, a fee is paid to the credit card company for each transaction. It would be advantageous if a municipality or fleet owner could issue cards or other identification (e.g., RF ID tags) or use existing cards and register them with the pay station operator, so that transactions using such registered cards would be handled differently and advantageously by not accruing credit card transaction fees with every use.

SUMMARY OF THE INVENTION

The present invention provides an enhancement to a standard pay station that adds value to its operation so that municipalities, fleet operators and the like, as well as other subscribers (hereinafter, a "fleet"), by allowing certain credit cards, debit cards, or other identification to be registered with the pay station operator and thereafter avoid incurring transaction fees, for example those charged by the acquiring bank when a credit card transaction is processed, for each individual transaction. The fleets provide data representative of a list of credit or debit card numbers, or RFID tag values (hereinafter, an "account identification numbers") to be registered to form a fleet list.

If required by the security policy of the fleet, pay station operator, issuing bank, or acquiring bank, the account identification information in the fleet list may be encoded by a hash or encryption key that can be used with a predetermined hash or encryption algorithm. The same algorithm and key are maintained in the pay station database, or other secure location, for use with account identification information read from an account identification (e.g., credit card, debit card, RFID tag).

Whenever an incoming account identification information matches one of the entries in the pre-registered fleet list (or the account identification information, once encoded, matches one of the encoded entries in the pre-registered fleet list), a transaction is recorded in a fleet transaction list for subsequent reporting to and reconciliation with the fleet. The fleet transaction list can be provided from time to time to the municipality or fleet operator or other subscriber, or used by the pay station operator to bill either the fleet, the original account identification (consolidating transactions associated with the same account identification), or a substitute account identification associated with each fleet. The subscriber (fleet) generally receives or can access a report of the usage and status for each of their pre-registered cards. This way, they can easily track usage of any of these cards.

DESCRIPTION OF THE FIGURES

Attention is now called to several drawings that illustrate features of the present invention.

Several drawings and illustrations have been provided to aid in understanding the present invention. The scope of the present invention is not limited to what is shown in the figures.

DESCRIPTION OF THE INVENTION

The present invention relates to an enhancement for pay stations that lets them track usage of pre-registered credit cards while providing security from card theft or unauthorized access to credit card numbers.

Herein, a credit card is used as an exemplary form of "account identification". Other forms of account identification include debit cards, RFID tags, biometric measures (e.g., fingerprint, retina, voice), etc., which may be used alone or in conjunction with other information to identify a specific account and authorization. "Account identification information" is used herein to refer to the information conveyed by the account identification and, when needed, other information need to confirm the information from the account identification. For example, the account identification information from a credit card is the account number and other information may include additional authentication information available on the magnetic tracks of the credit card, or a card verification value (CVV) printed on the back of the card. Another example of other information that may be included with account identification information is a PIN number (personal identification number) as commonly used with a debit card or biometric measure. Account identification may comprise a username or account number or other referent that may be entered via keyboard, for which the other information augmenting the account identification information may be a password, PIN number, or Herein, a pay station comprises a reader for accepting an account identification, which may be a magnetic stripe reader for a credit or debit card, and RFID reader for an RFID tag, an appropriate biometric reader for the specific biometric measure of interest, and a keyboard or keypad as necessary for entering PIN numbers, account names, or passwords.

Figure 1:
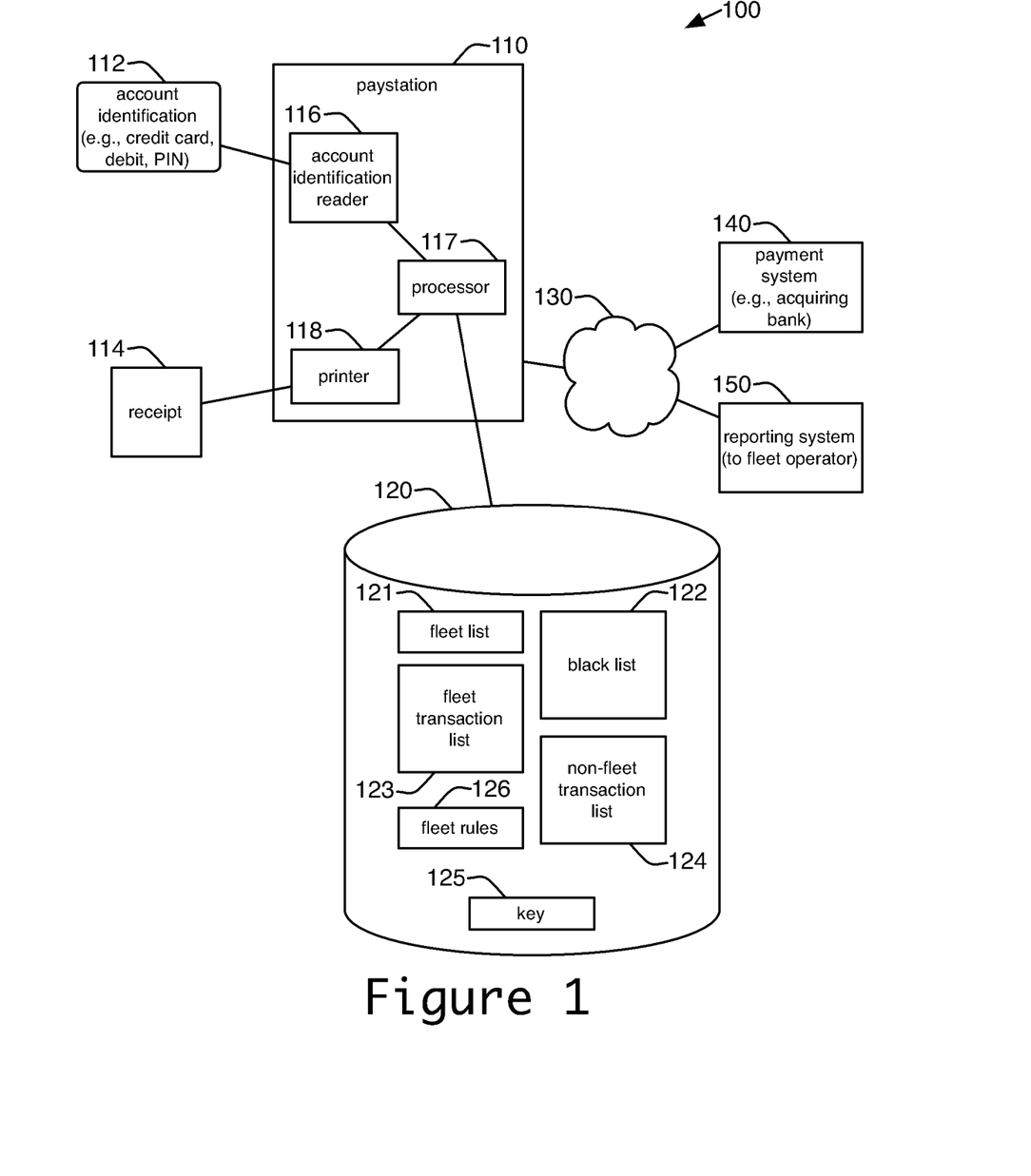
FIG. 1 is a block diagram showing a pay station of the present invention and its interconnection to external payment and reporting systems.

Turning to FIG. 1, a pay station 110 is shown. The pay station 110 comprises a reader 116 of a type corresponding to credit card 112, so that the account identification information may be known to pay station 110 (e.g., a credit card number and other information necessary for a credit card based transaction; or a debit card and PIN number, though a keypad for entry of a PIN number is not shown). Pay station 110 comprises a processor 117 programmed to execute transactions as described below. Pay station 110 further comprises a printer 118 and dispenser (not shown) such that when a payment for a transaction with the account identification information is allowed, a receipt 114 may be issued by printer 118 to a patron.

In the case of parking, receipt 114 may sometimes be used to exit the parking lot, or receipt 114 may be posted on the dashboard of a parked vehicle to verify parking authorization and duration.

Additionally, in the case of parking, but also in other scenarios, pay station 110 may accept a ticket (not shown) with a ticket reader (not shown), the ticket being issued upon entry to a parking lot. Information obtained by reading the ticket may be used to determine the value of the transaction (e.g., for a parking fee based on a duration from a entry time indicated by the ticket). Instead of the ticket, a receipt or other piece of information may be issued, with the pay station comprising an appropriate reader or entry device (none shown). In some embodiments, the ticket reader or appropriate reader or entry device may be account identification reader 116 as discussed above.

The pay station 110 is in communication with a database 120 which may be remote and located at the office of the pay station operator or elsewhere. In another embodiment, database 120 is internal or otherwise local to pay station 110. The database 120 may contain a "black list" 122 of known bad credit cards. For the improvement of the present invention, database 120 contains a fleet list 121 of credit cards (and/or other account identifications) registered with the pay station operator by fleet operators or their members. As pay station 110 handles transactions with account identifications listed in fleet list 121 and others, transaction logs 123 and 124 record those transaction: fleet transaction log 123 lists transactions conducted using an account identification at a time when that account identification is listed in the fleet list 121; non-fleet transaction log 124 lists other transactions (i.e., those conducted with cash, or using account identification not listed in fleet list 121 at the time of the transaction.

Communication by pay station 110 with a payment system 140 (e.g., one provided by an acquiring bank for debit or credit card transactions) is through communication channel 130, which may comprise a telephone line, wireless connection, or the Internet. Communication through channel 130 may be available continuously, upon demand, or periodically (e.g., for daily uploads). The same or similar communication channel 130 provides communication between the pay station 110 and reporting system 150 (e.g., provided by the pay station operator).

For a non-fleet transactions 124, if pay station 110 is unable to connect with payment system 140 contemporaneously, the non-fleet transactions may be rejected, or stored unpaid for resubmission to payment system 140 at a later time.

Fleet transactions 123 are stored in database 120 for later transmission to reporting system 150. Further, fleet transactions having common account identification information may be aggregated into a single transaction (whether or not itemized) and submitted to payment system 140. In an alternative embodiment, fleet transactions associated with a common fleet operator may be billed to the fleet operator or to a payment system 140 using an account identification information provided by the fleet operator, which may be different than account identification information provided with any individual transaction. Such later submissions to payment system 140 may be initiated by pay station 110, or by reporting system 150.

Typically, credit card numbers are only stored until the credit card company acknowledges billing, for security reasons. If, according to security policy, the credit card numbers or account identifications in fleet list 121 and/or black list 122 shall not be stored in plaintext, then in the corresponding embodiment the account identification information in those lists are hashed or encrypted using a predetermined algorithm and cryptographic key 125. Then, when account identification 112 is presented, the corresponding account identification information is read and hashed or encrypted by the processor 117 of pay station 110, in accordance with the predetermined algorithm and cryptographic key 125, to make encrypted account identification number for comparison with fleet list 121 and/or black list 122 to determine whether or not the transaction is a fleet or non-fleet transaction, or whether the transaction should be cancelled as discussed below in conjunction with FIGS. 2 & 3.

In some embodiments, database 120 may contain rule-based policies 126 for transactions involving account identification information related to particular fleets. For example, it may be that for a particular fleet, entries in the fleet list 121 are only valid from 7 AM to 9 PM, and that transactions (or, alternatively, the portion of a transaction outside those hours) is a non-fleet transaction. In another example, a particular fleet may have policies expressed in these rules that limit a fleet transaction to a maximum duration, or a particular maximum number of transactions per month, or not on weekends. Some rules may specify that the portion of a transaction exceeding the maximum duration, or the transactions that exceed the maximum number of transactions per month, or transactions or portions of transactions that occur on weekends, are treated as non-fleet transactions. Alternatively, policies may clamp a fleet transaction to a maximum duration, so, for example, even though a parking duration was for all day, a fleet transaction is treated as though the duration was only four hours. Such fleet-specific rules 126 may be stored in database 120, an example implementation of which is discussed in conjunction with FIG. 4. In an alternative embodiment, specific rules may apply to all fleet transactions. In other embodiments, the rules may be made a part of the programming for processor 117, rather than being stored in database 120.

Figure 2:
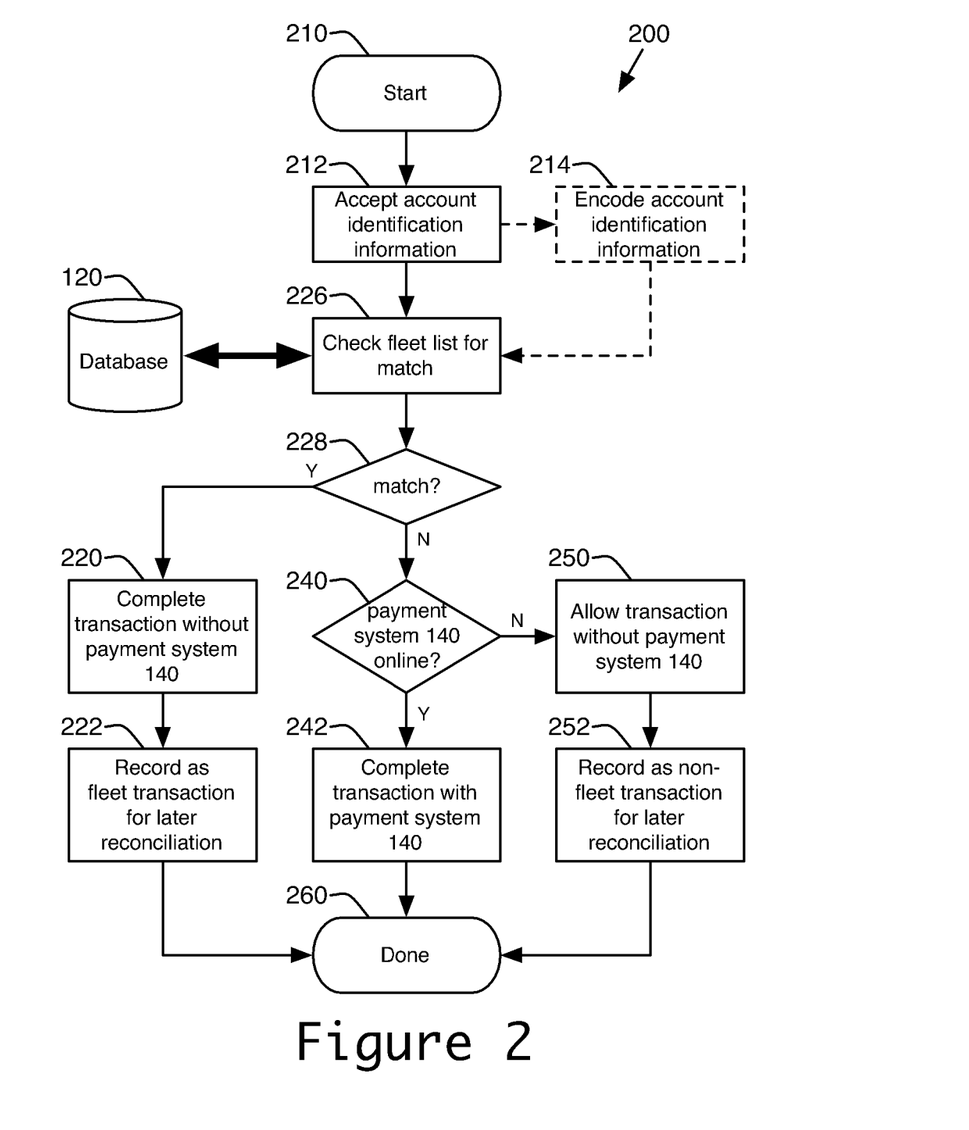
FIG. 2 shows an improved process for transacting with credit cards (or other account identifications) using a fleet list.

FIG. 2 is a flowchart for an improved transaction process 200 of the present invention, as may be performed by processor 117.

Transaction process 200 begins at 210, typically being triggered by the presentation and reading of account identification (e.g., credit card 112) by the account identification reader (e.g., credit card reader 116) to capture account identification information (e.g., a credit card number and authentication codes), which is accepted at 212.

At 226, the fleet list 121 in database 120 is checked for a match to the account identification information. However, if policy dictates, the account identification information is encoded (as described, e.g., using cryptographic key 125) at 214, and the encrypted account identification information is used instead for check 226.

If, at 228, the results of check 226 show a match, that is, the account identification information is represented in fleet list 121, then processing continues at 220.

Otherwise, at 228, if the account identification information was not represented in fleet list 121, then processing continues at 240, where a check is made to determine whether communication is available to payment system 140, and it is online. If so, then at 242 the transaction using the account identification information is completed with payment system 140, a receipt printed, and a record of the transaction is stored in non-fleet transaction list 124, marked as complete, after which, process 200 concludes at 260.

However, if at 240 communication with payment system 140 is not available or if payment system 140 is offline, then continuing at 250, the transaction may be allowed, and a receipt may be printed, but at 252 the transaction is stored in non-fleet transaction list 124 and marked as incomplete, thus requiring later reconciliation (e.g., nightly, or the next time communication with payment system 140 is available). Once the transaction is logged, however, process 200 completes at 260.

In an alternative embodiment, instead of the transaction being allowed at 250, the process may require a different method of payment (e.g., by looping back to start 210, loop not shown), or the transaction may be cancelled (not shown).

At 220, the process completes the transaction without using payment system 140, because the account identification information was represented in fleet list 121. The completion of the transaction is in accordance with the policies and rules 126 appropriate to the fleet with which the account associated with the account identification information is registered. A receipt may be printed and the transaction is recorded in fleet transaction list 123 for later reconciliation or reporting.

If at 222 the transaction exceeds any limits set by rules of the corresponding (e.g., as found in fleet rules 126), then any excess portion of the transaction is processed by branching back to 240 (branch not shown) and processing the remainder as a non-fleet transaction.

Process 200 concludes at 260.

Figure 3:
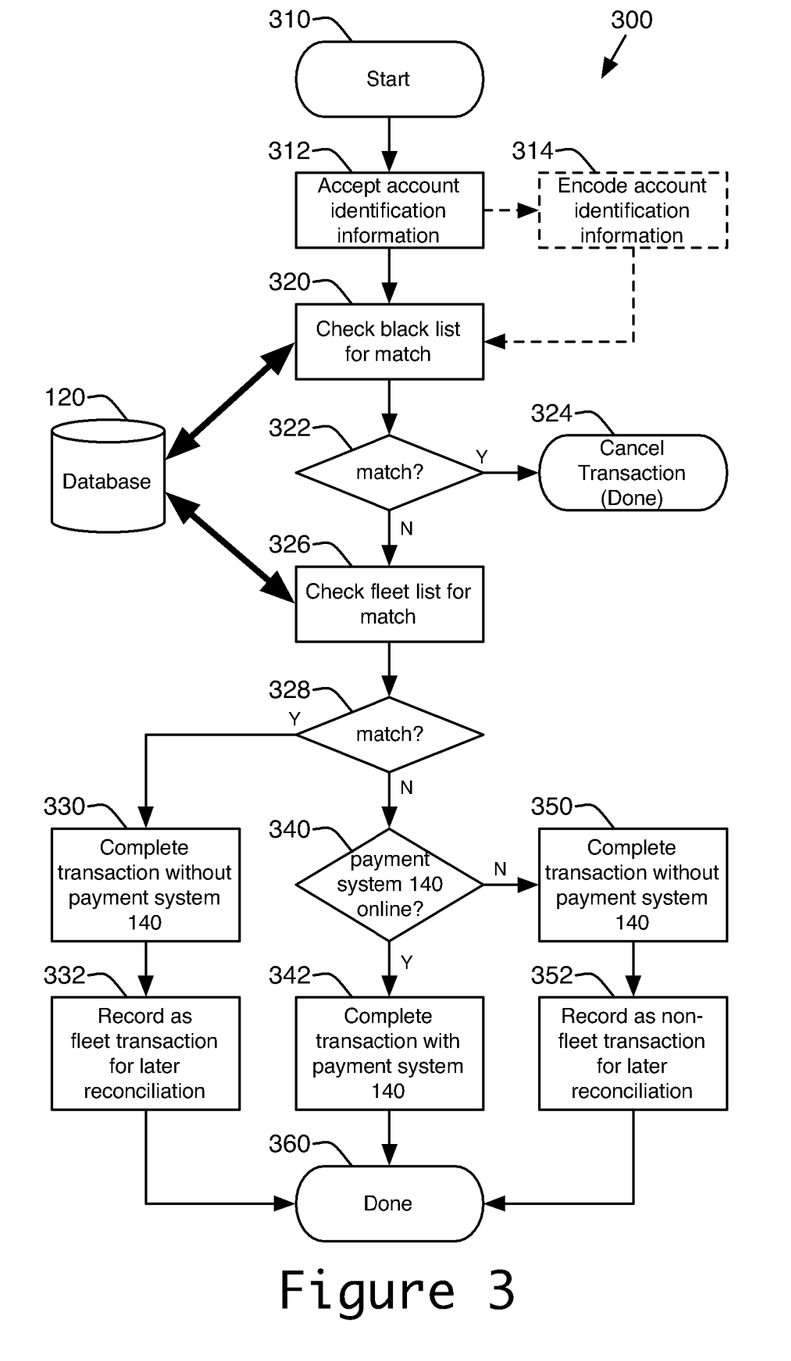
FIG. 3 shows another improved process for transaction with credit cards (or other account identifications) using a fleet list and a black list.

Another improved transaction process 300 of the present invention is shown in the flowchart of FIG. 3, as may be performed by processor 117.

Transaction process 300 begins at 310, typically being triggered by the presentation and reading of account identification (e.g., credit card 112) by the account identification reader (e.g., credit card reader 116) to capture account identification information (e.g., a credit card number and authentication codes), which is accepted at 312.

At 320, the black list 122 in database 120 is check for a match to the account identification information. However, if policy dictates, the account identification information is encoded (as described, e.g., using cryptographic key 125) at 314, and the encrypted account identification information is used instead for check 320.

If, at 322, the results of check 320 show a match, that is, the account identification information is represented in black list 122, then the transaction is cancelled at 324 and process 300 terminates. In the alternative, instead of terminating, process 300 may loop back to 310, requesting a different form of payment (loop back not shown).

However, if at 322, the results of check 320 indicate no match, that is, the account identification information is not represented in the black list 122, the process continues at 326.

At 326, the fleet list 121 in database 120 is checked for a match to the account identification information. Though, if policy dictates, the encoded account identification information from 314 is used instead for check 326.

If, at 328, the results of check 326 show a match, that is, the account identification information is represented in fleet list 121, then processing continues at 320.

Otherwise, at 328, if the account identification information was not represented in fleet list 121, then processing continues at 340, where a check is made to determine whether communication is available to payment system 140, and it is online. If so, then at 342 the transaction using the account identification information is completed with payment system 140, a receipt printed, and a record of the transaction is stored in non-fleet transaction list 124, marked as complete, after which, process 300 concludes at 360.

However, if at 340 communication with payment system 140 is not available or if payment system 140 is offline, then continuing at 350, the transaction may be allowed, and a receipt may be printed, but at 352 the transaction is stored in non-fleet transaction list 124 and marked as incomplete, thus requiring later reconciliation (e.g., nightly, or the next time communication with payment system 140 is available). Once the transaction is logged, however, process 300 completes at 360.

In an alternative embodiment, instead of the transaction being allowed at 350, the process may require a different method of payment (e.g., by looping back to start 310, loop not shown), or the transaction may be cancelled (not shown).

At 320, the process completes the transaction without using payment system 140, because the account identification information was represented in fleet list 121. The completion of the transaction is in accordance with the policies and rules 126 appropriate to the fleet with which the account associated with the account identification information is registered. A receipt may be printed and the transaction is recorded in fleet transaction list 123 for later reconciliation or reporting.

If at 322 the transaction exceeds any limits set by rules of the corresponding (e.g., as found in fleet rules 126), then any excess portion of the transaction is processed by branching back to 340 (branch not shown) and processing the remainder as a non-fleet transaction.

Process 300 concludes at 360.

Figure 4:
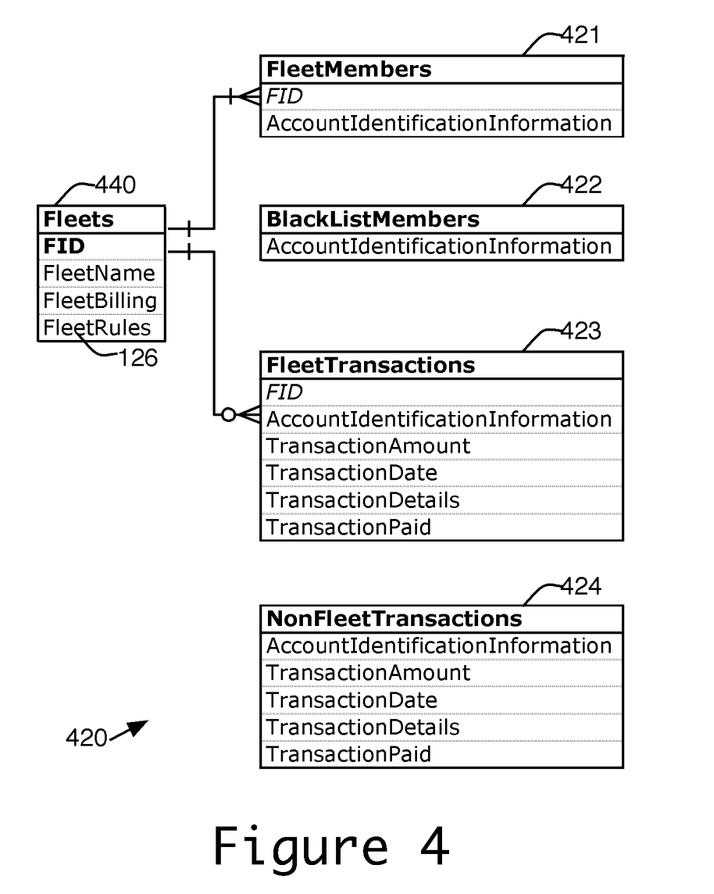
FIG. 4 shows a database schema suitable for use in the present invention; and, FIG. 5 shows another database schema suitable for use in the present invention.

FIG. 4 shows a schema 420 representing one example embodiment of database 120. Schema 420 shows Fleets table 440. Fleets table 440 comprises one or more records representing information about one fleet or subscriber. Each fleet record in Fleets table 440 is uniquely identified by a fleet identifier (FID), and includes the fleet name, fleet billing information (such as billing method, and billing account information), and fleet rules and policies, if any.

FleetMembers table 421 is an example embodiment of fleet list 121, wherein each record of FleetMembers table 421 has both account identification information (e.g., a credit card number) and the FID of the record in Fleets table 440 corresponding to the fleet with which that account is registered. In this way, a credit card may be registered as belonging to a fleet. While fleet records in table 440 may be associated with one or more records in FleetMembers 421 (fleets can have many members), but each record in FleetMembers 421 should be associated with only a single fleet record in Fleets table 440. In an alternative embodiment (not shown), where a credit card may be registered to more than one fleet, transaction processes such as 200 & 300 would need to be extended so that when checks 226 and 326 detect a credit card having a membership in multiple fleets, the one fleet that should be used for a transaction is determined before continuing, for example, by asking the patron for a selection.

BlackListMembers table 422 is an embodiment of black list 122, wherein each record comprises the account identification information (e.g., credit card number) of a deprecated account.

FleetTransactions table 423 is an embodiment of fleet transactions list 123. In it, each record contains a reference to the single FID for the record of the fleet with which it is associated. In this embodiment, each record of the FleetTransactions table 423 includes the account identification information accepted at 212 (in transaction process 200) or 312 (in transaction process 300), Other transaction information such as the amount, date, and other details (e.g., parking location, parking duration) may also be recorded.

The TransactionPaid field may be filled if and when the pay station 110 performs a billing transaction with payment system 140 that includes the transaction associated with the record in FleetTransactions table 523, otherwise it remains empty.

NonFleetTransactions table 424 is an embodiment of non-fleet transactions list 124. The fields of its records are similar to those in FleetTransactions table 423, but there is no associated fleet identifier (FID). In NonFleetTransactions table 424, the TransactionPaid field is filled with information related to the interaction with payment system 140.

Figure 5:
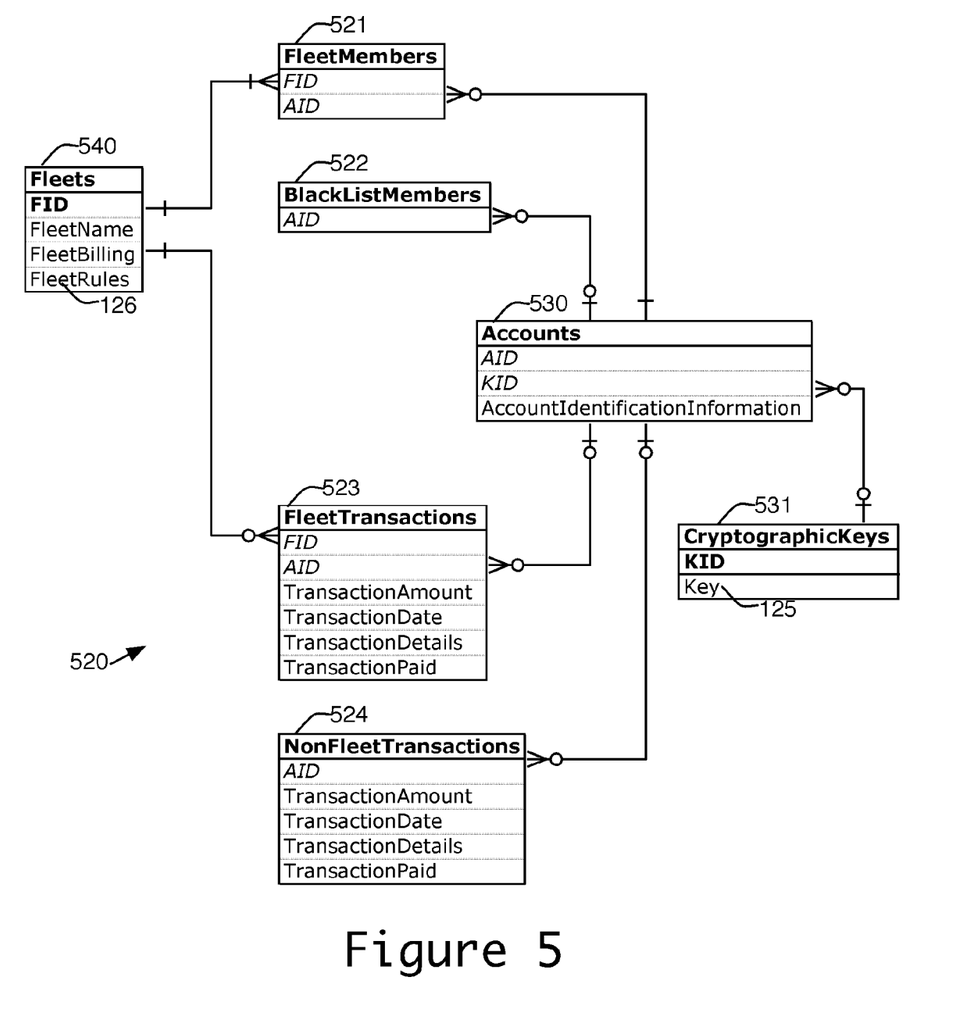

FIG. 5 shows another schema 520 representing another example embodiment of database 120, in which Fleets table 540 is identical to Fleet table 440; and the FleetMembers 521, BlackListMembers 522, FleetTransactions 523, and Non-FleetTransactions 524 tables in schema 520 are similar to respective and like-named tables 421, 422, 423, and 424 in schema 420, but instead of an AccountIdentificationInformation field in each record of each table, there is an account identifier (AID). The AID in each record of tables 521-524 refers to the record identifiers in Accounts table 530. Each record in Accounts table 530 contains information representative of the account identification information, but it can be hashed or encrypted using cryptographic key 125, which may be stored as records in CryptographicKeys table 531, in which case a key identifier (KID) uniquely identifying the record in table 531 appears in those records in Accounts table 530 for which it was used. Similarly, an algorithm identifier (not shown) could be incorporated into each record of Accounts table 530, to select among different hash or encryption algorithms known to the processor 117 of pay station 110. In some embodiments, different account identification authorities or fleets can specify different encryption algorithms or different keys. If, for individual records in Accounts table 530, the account identification information is not encrypted, the KID value in the record may be null. In some embodiments, CryptographicKeys table 531 may not be stored in database 120, but may instead be loaded into a cryptographic module or internal memory associated with processor 117, so that the keys are not accessible or otherwise subject to hacking.

In an alternative embodiment where encoding of account identification information is not used at all, table 531 would be omitted and the records in Accounts table 530 would have no KID field.

Several descriptions and illustrations have been provided to aid in understanding the present invention. One of skill in the art will realize that numerous changes and variations may be made without departing from the spirit of the invention. For example, while the examples provided herein have made use of a database using a relational structure selected for clarity of description, those skilled in the art recognized that other data structures or file-based mechanisms could be used with equal success. Each of these changes and variations is within the scope of the present invention.

We claim:

1. A computer-implemented method of tracking credit card usage at pay stations, the method comprising the steps of:
   a) storing a first list of data representative of credit card numbers for which a transaction is permitted in a memory available to a pay station;
   b) accepting by a credit card reader of the pay station, a first credit card number;
   c) searching said first list with a processor of the pay station, said processor having communication with the reader and the memory, and finding data representative of said first credit card number in the first list; and,
   d) recording a first transaction in a first log in the memory with the processor, said first log comprising data representative of said first transaction, said first transaction not individually submitted to any acquiring bank and said first credit card number.

2. The method of claim 1 further comprising the steps of:
   e) accepting with the credit card reader a second credit card number;
   f) searching said first list with the processor, and not finding data representative of said second credit card number in the first list; and,
   g) performing a second transaction with the processor, the processor having communication with an acquiring bank, the second transaction further being performed with said acquiring bank and said second credit card number.

3. The method of claim 1 wherein the processor has access to a cryptographic key and algorithm and said first list is encoded with the algorithm and the key, wherein step c) further comprises encoding said first credit card number with the algorithm and the key for use when searching said first list for data representative of said first credit card number.

4. The method of claim 1 wherein the processor has access to a hash algorithm and said first list is encoded with the algorithm, wherein step c) further comprises encoding said first credit card number with the algorithm for use when searching said first list for data representative of said first credit card number.

5. The method of claim 1, wherein the data representative of the first transaction comprises data representative of the first credit card number.

6. The method of claim 5, further comprising the step of:
   e) transferring the first log for use in billing a subscriber associated with the first credit card.

7. The method of claim 6, wherein the subscriber is a municipality.

8. The method of claim 6, wherein the subscriber is a fleet operator.

9. The method of claim 1, wherein the first credit card is associated with a first subscriber and the first transaction is one of a plurality of transactions associated with the first subscriber in the first log, the method further comprising the step of:
   e) aggregating the plurality of transactions into a report provided to the first subscriber.

10. The method of claim 1, wherein the first credit card is associated with a first subscriber and the first transaction is one of a plurality of transactions associated with the first credit card in the first log, the method further comprising the step of:
    e) aggregating the plurality of transactions into a second transaction, the second transaction being performed with an acquiring bank and said first credit card number.

11. The method of claim 1, wherein the first credit card is associated with a first subscriber and the first transaction is one of a plurality of transactions associated with the first subscriber in the first log, the method further comprising the step of:
    e) aggregating the plurality of transactions into a second transaction, the second transaction being performed with an acquiring bank and a second credit card number corresponding to the subscriber.

12. A computer-implemented method of tracking account identification usage at pay stations, the method comprising the steps of:
    a) accepting, with an account identification reader of a pay station, a first account identification information;

b) searching a first list for data representative of the first account identification information, with a processor of the pay station, the first list in a memory accessible by the pay station, wherein the first list comprises data representative of said first account identification information; and, c) recording a first transaction in a first log in the memory with the processor, said first log comprising data representative of said first transaction, said first transaction not individually submitted to any payment system.

13. The method of claim 12 further comprising the steps of:

d) accepting, with the account identification reader, a second account identification information;

e) searching said first list for data representative of the second account identification information, with the processor, wherein the first list does not comprise data representative of said second account identification information; and, f) performing a second transaction with the processor, the processor having communication with a payment system, the second transaction further being performed with said payment system and said second account identification information.

14. The method of claim 12 wherein the account identification reader is for at least one of a credit card, debit card, and an RFID tag.

15. A pay station comprising:

a reader for an account identification; and, a processor having communication with a memory and the reader, the memory containing a first list of data representative of account identification information, the processor programmed to perform the steps of:

a) accepting, through the reader, a first account identification information, b) searching said first list for data representative of the first account identification information, wherein the first list comprises data representative of said first account identification information, and, c) recording a first transaction in a first log in the memory with the processor, said first log comprising data representative of said first transaction, said first transaction not individually submitted to any payment system.

16. The pay station of claim 15, wherein the processor has communication with a payment system, and the processor is further programmed to perform the steps of:

d) accepting, through the reader, a second account identification information, e) searching said first list for data representative of the second account identification information, wherein the first list does not comprise data representative of said second account identification information, and, f) performing a second transaction with the processor, the payment system, and the second account identification information.

* * * * *